United States Patent
Williamson

(10) Patent No.: US 12,037,082 B2
(45) Date of Patent: Jul. 16, 2024

(54) INTERNAL BOLT BICYCLE CHAIN TENSIONER

(71) Applicant: Morgan Williamson, Long Beach, CA (US)

(72) Inventor: Morgan Williamson, Long Beach, CA (US)

( * ) Notice: Subject to any disclaimer, the term of this patent is extended or adjusted under 35 U.S.C. 154(b) by 0 days.

(21) Appl. No.: 18/070,116

(22) Filed: Nov. 28, 2022

(65) Prior Publication Data

US 2023/0182862 A1     Jun. 15, 2023

Related U.S. Application Data

(60) Provisional application No. 63/288,582, filed on Dec. 11, 2021.

(51) Int. Cl.
*B62M 9/16* (2006.01)

(52) U.S. Cl.
CPC ..................... *B62M 9/16* (2013.01)

(58) Field of Classification Search
CPC . B62M 9/16; F16H 7/14; B62K 25/02; B62K 25/10; B62K 25/00
USPC ......................................... 474/116
See application file for complete search history.

(56) References Cited

U.S. PATENT DOCUMENTS

| | | | | |
|---|---|---|---|---|
| 609,062 A * | 8/1898 | Webb | ...................... | B62M 9/16 474/116 |
| 5,546,665 A * | 8/1996 | Jackmauh | ................ | B62M 9/16 180/231 |
| 5,888,159 A * | 3/1999 | Liao | .......................... | F16H 7/14 474/101 |
| 7,287,772 B2 * | 10/2007 | James | ..................... | B62K 25/02 474/116 |
| 7,572,199 B1 * | 8/2009 | Calendrille, Jr. | ....... | B62M 9/125 474/82 |
| 7,703,787 B2 * | 4/2010 | Kawamura | .......... | B62K 25/283 280/288 |
| 8,740,239 B2 * | 6/2014 | Lumpkin | ............... | B62K 19/30 280/285 |
| 8,827,024 B1 * | 9/2014 | Sumi | ....................... | B62M 9/16 301/111.01 |
| 10,472,019 B2 * | 11/2019 | Pfeiffer | .................. | B62K 25/02 |

(Continued)

FOREIGN PATENT DOCUMENTS

| | | | | |
|---|---|---|---|---|
| EP | 2998214 A1 * | 3/2016 | ............... | B62M 9/16 |
| WO | WO-2015079425 A1 * | 6/2015 | ............... | B60G 3/01 |

OTHER PUBLICATIONS

LighTech prior marketed invention from Amazon website (Year: 2020).*
WO 2015079425 A1 Nolin et al. (Year: 2015).*

*Primary Examiner* — Henry Y Liu
(74) *Attorney, Agent, or Firm* — Averill, Green & Kim; Philip Y Kim; Kenneth L. Green

(57) ABSTRACT

A bicycle chain tensioner provides precise adjustment and alignment of a rear axle, and shields an adjusting screw. A tensioner housing includes an axle hole and a slide pressing against an axle flange, the slide positioned by the adjusting screw. The tensioner housing is moved forward and rearward by the adjusting screw to adjust the axle position. The tensioner holds the axle in the desired position while axle nuts are tightened to prevent the axle moving during tightening. An indicator on the slide points to a scale on the housing to match right and left tensioner positions.

15 Claims, 4 Drawing Sheets

(56) References Cited

U.S. PATENT DOCUMENTS

| | | | | |
|---|---|---|---|---|
| 2002/0098933 A1* | 7/2002 | Kline | ....................... | B62M 9/16 |
| | | | | 474/116 |
| 2005/0026731 A1* | 2/2005 | Skidmore | ................ | B62M 9/16 |
| | | | | 474/136 |
| 2008/0194364 A1* | 8/2008 | Greilinger | ................ | B62M 9/16 |
| | | | | 474/101 |
| 2010/0181742 A1* | 7/2010 | Mori | ....................... | B62M 9/16 |
| | | | | 280/284 |

\* cited by examiner

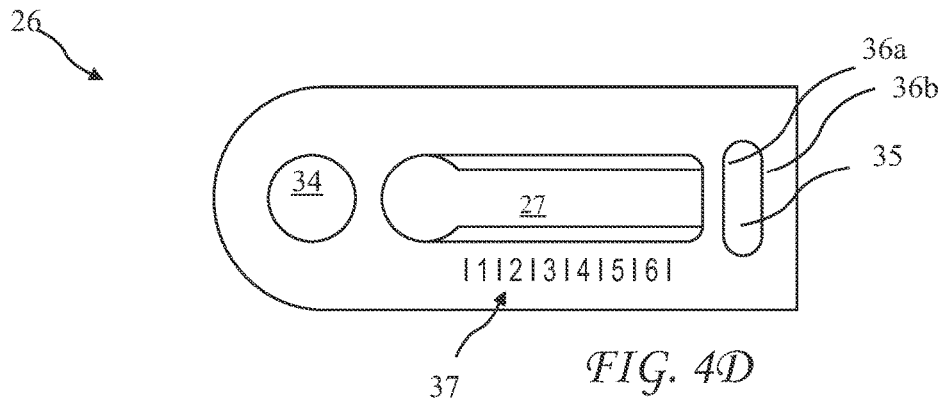
FIG. 4D
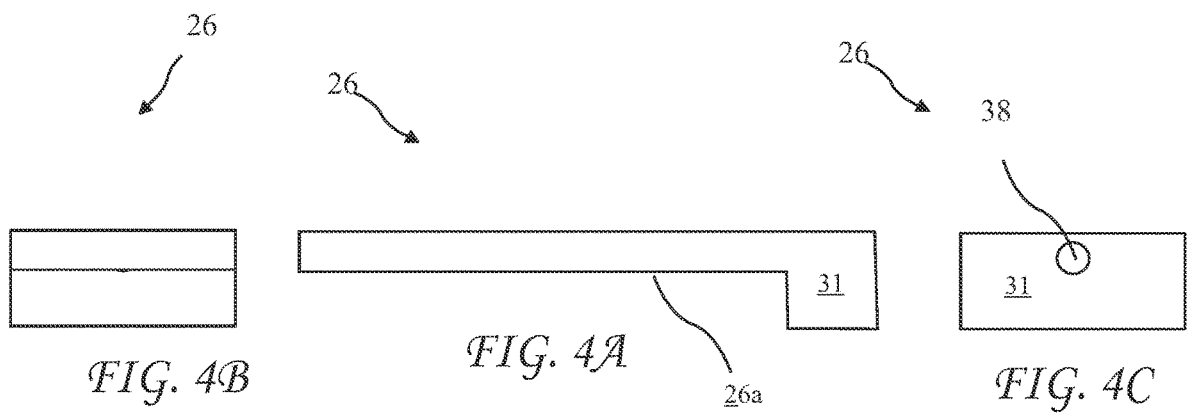
FIG. 4B
FIG. 4A
FIG. 4C
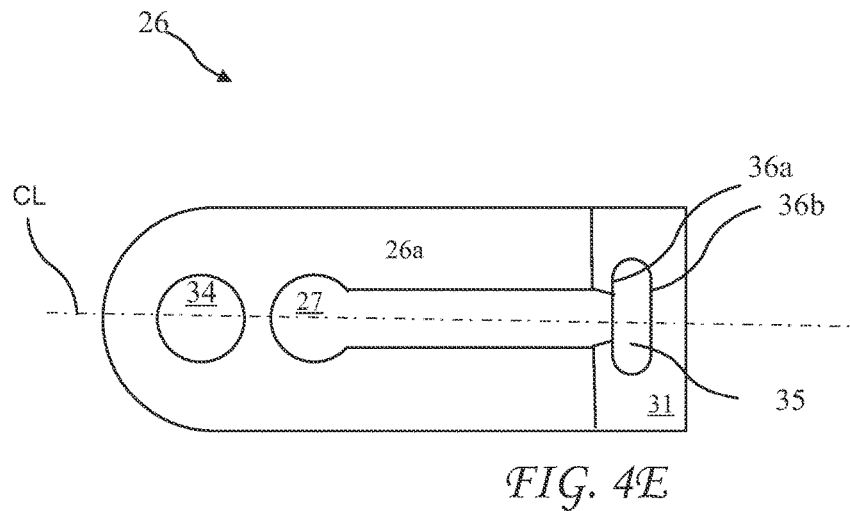
FIG. 4E

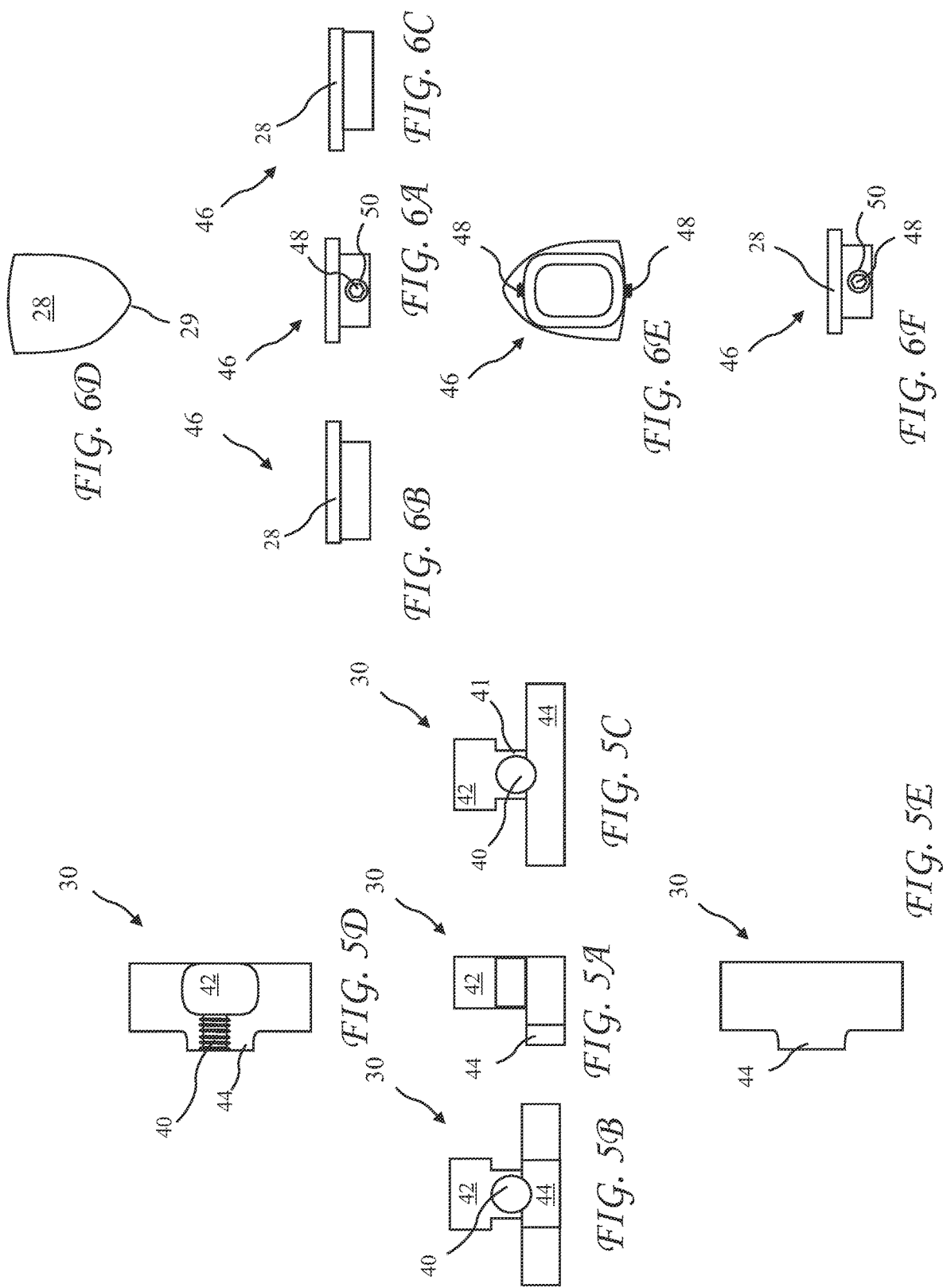

INTERNAL BOLT BICYCLE CHAIN TENSIONER

CROSS-REFERENCE TO RELATED APPLICATIONS

The present application claims the priority of U.S. Provisional Patent Application Ser. No. 63/288,582 filed Dec. 11, 2021, which application is incorporated in its entirety herein by reference.

BACKGROUND OF THE INVENTION

The present invention relates to bicycle chain tension and in particular to a precision chain tensioner.

Bicycle chains require maintaining a correct tension for chain life and retention. A rear axle generally is held in an axle slot by nuts tightened onto threaded ends of the axle. If one of the nuts becomes loose, the axle can slide in the axle slot and either the chain tension, rear wheel alignment, or both can come out of adjustment. The axle may also move when tightening the axle nuts spoiling the alignment.

BRIEF SUMMARY OF THE INVENTION

The present invention addresses the above and other needs by providing a bicycle chain tensioner providing precise adjustment and alignment of a rear axle, and shields an adjusting screw. A tensioner housing includes an axle hole and a slide pressing against an axle flange, the slide positioned by the adjusting screw. The tensioner housing is moved forward and rearward by the adjusting screw to adjust the axle position. The tensioner holds the axle in the desired position while axle nuts are tightened to prevent the axle moving during tightening. A pointed indicator on the slide points to a scale on the housing to match right and left tensioner positions.

In accordance with one aspect of the invention, there is provided a bicycle chain tensioner including an internal screw. The internal screw engages a threaded hole in a slide, moving the slide with respect to a tensioner housing. The slide presses against a fixed axle flange to locate the tensioner housing. A rear axle passes through an axle hole in the tensioner housing to position the axle.

In accordance with another aspect of the invention, there is provided a bicycle chain tensioner providing precise adjustment of chain tension. The axle is positioned by an axle hole in the tensioner housing, and the housing is precisely positioned by the internal screw moving a slide in the housing. The slide pushing against an axle flange fixed to the bicycle frame.

In accordance with yet another aspect of the invention, there is provided a bicycle chain tensioner including an internal screw. The internal screw is entirely inside a tensioner housing and adjusted using a tool inserted through a screw window in the tensioner housing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4A is a top view of a tensioner housing of the bicycle chain tensioner according to the present invention.

FIG. 4B is a front view of the tensioner housing of the bicycle chain tensioner according to the present invention.

FIG. 4C is a rear view of the tensioner housing of the bicycle chain tensioner according to the present invention.

FIG. 4D is a side view of the tensioner housing of the bicycle chain tensioner according to the present invention.

FIG. 4E is an opposite side view of the tensioner housing of the bicycle chain tensioner according to the present invention.

FIG. 5A is a top view of a slide of the bicycle chain tensioner according to the present invention.

FIG. 5B is a front view of the slide of the bicycle chain tensioner according to the present invention.

FIG. 5C is a rear view of the slide of the bicycle chain tensioner according to the present invention.

FIG. 5D is a side view of the slide of the bicycle chain tensioner according to the present invention.

FIG. 5E is an opposite side view of the slide of the bicycle chain tensioner according to the present invention.

FIG. 6A is a side view of a slide hat of the bicycle chain tensioner according to the present invention.

FIG. 6B is a front view of the slide hat of the bicycle chain tensioner according to the present invention.

FIG. 6C is a rear view of the slide hat of the bicycle chain tensioner according to the present invention.

FIG. 6D is a top view of the slide hat of the bicycle chain tensioner according to the present invention.

FIG. 6E is a bottom view of the slide hat of the bicycle chain tensioner according to the present invention.

FIG. 6F is an opposite side view of the slide hat of the bicycle chain tensioner according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
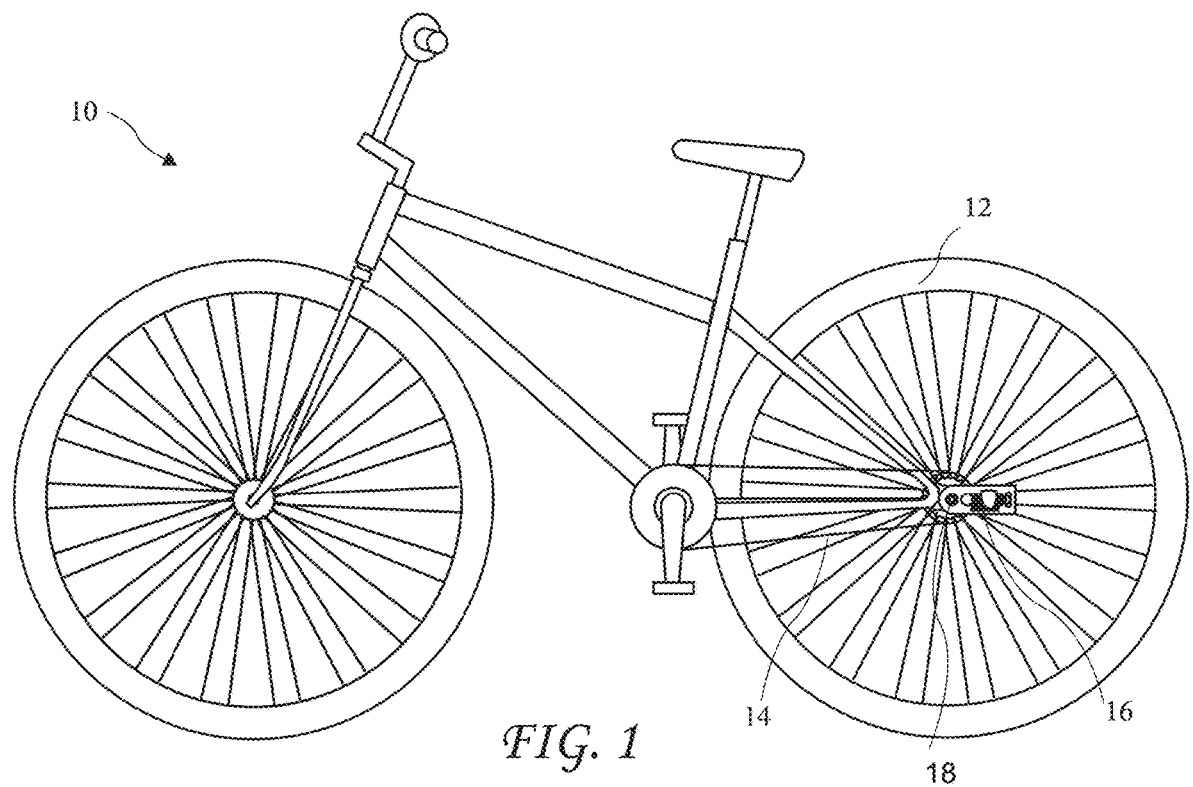
FIG. 1 shows a bicycle including a bicycle chain tensioner according to the present invention.
Figure 2:
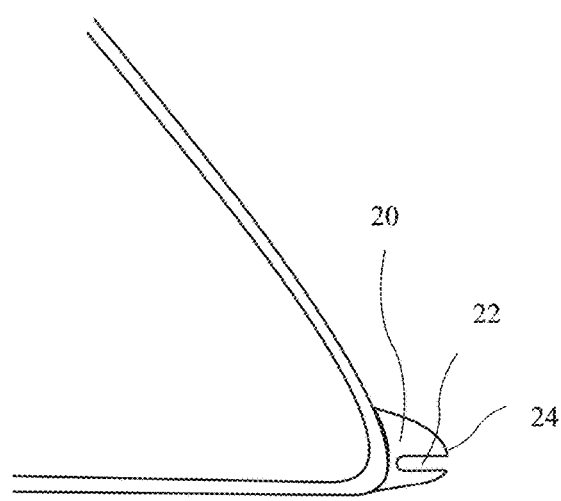
FIG. 2 shows an axle flange having an axle slot allowing adjustment of a rear bicycle wheel.

A bicycle 10 including a bicycle chain tensioner 16 according to the present invention is shown in FIG. 1 and an axle flange 20 having an axle slot 22 allowing adjustment of a rear bicycle wheel 12 is shown in FIG. 2. The bicycle chain tensioner 16 includes an axle hole 34 (see FIG. 3D) positioning an axle 18 of a rear bicycle wheel 12. The bicycle chain tensioner 16 includes a slide 30 (see FIG. 3A) pressing against a rear surface 24 of the axle flange 20 to position the bicycle chain tensioner 16 to provide a proper tension for a bicycle chain 14 and to align the rear bicycle wheel 12.

Figure 3D:
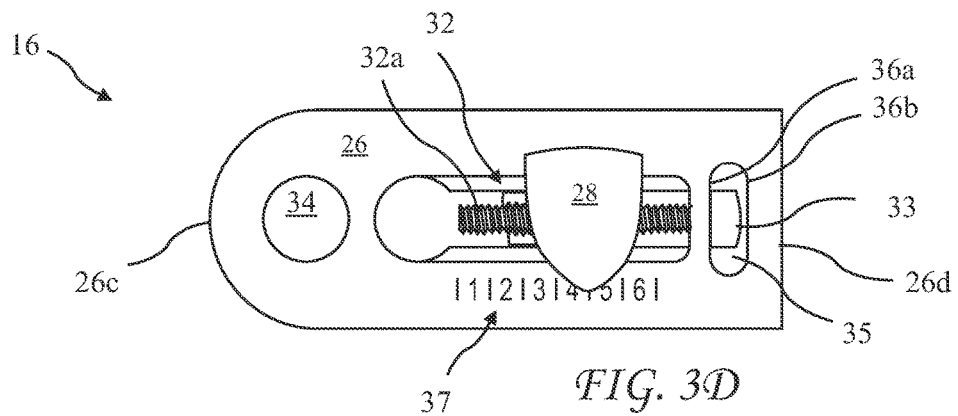
FIG. 3D is a side view of the bicycle chain tensioner according to the present invention.
Figure 3B:
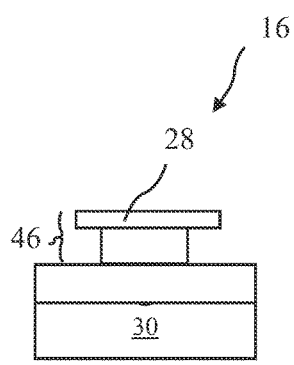
FIG. 3B is a front view of the bicycle chain tensioner according to the present invention.
Figure 3A:
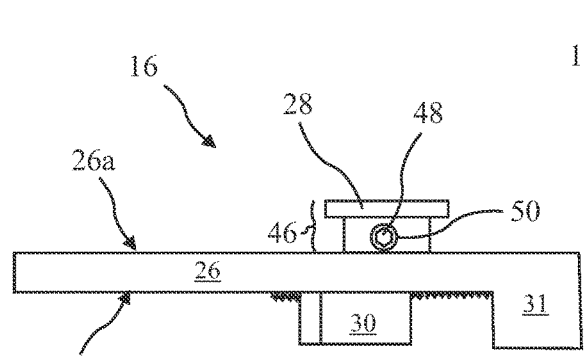
FIG. 3A is a top view of the bicycle chain tensioner according to the present invention.
Figure 3C:
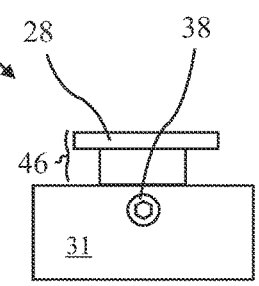
FIG. 3C is a rear view of the bicycle chain tensioner according to the present invention.
Figure 3E:
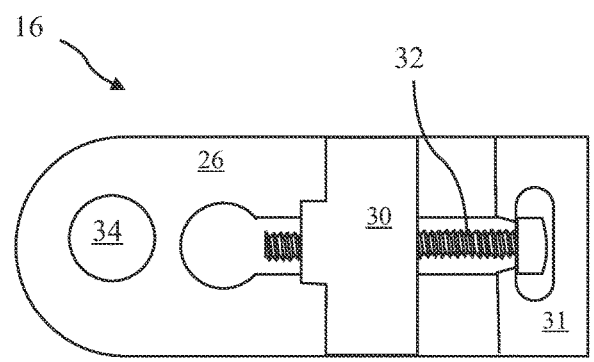
FIG. 3E is an opposite side view of the bicycle chain tensioner according to the present invention.

A top view of the bicycle chain tensioner 16 is shown in FIG. 3A, a front view of the bicycle chain tensioner 16 is shown in FIG. 3B, a rear view of the bicycle chain tensioner 16 is shown in FIG. 3C, a side view of the bicycle chain tensioner 16 is shown in FIG. 3D, and an opposite side view of the bicycle chain tensioner 16 is shown in FIG. 3E. The bicycle chain tensioner 16 includes a housing 26 and an internal screw 32 having threads 32a held captive in the bicycle chain tensioner 16 by the slide 30. A screw head 33 is held between front and rear surfaces 36a and 36b respectively of a screw head cavity 35 in a base 31 of the housing 26. A tool, for example a hex tool, torx tool, or similar tool is insertable through a screw window 38 to turn the screw 32 to adjust the slide 30.

The slide 30 rests against an inner surface 26b of the housing 26 and passes through a longitudinal channel 27 (see FIGS. 4D and 4E) in the housing 26, with a head 42 (see FIGS. 5A-5D) extending past an outer surface 26a of the slide 26. A hat 46 resides over the head 42 and is held in place on the head 42 by set screws 48 in set screw threads 50. The hat 46 includes an indicator 28 alignable with the scale 37 to show a position of the bicycle chain tensioner 16 and of the axle hole 34.

A top view of the tensioner housing 26 is shown in FIG. 4A, a front view of the tensioner housing 26 is shown in FIG. 4B, a rear view of the tensioner housing 26 is shown in FIG. 4C, a side view of the tensioner housing 26 is shown in FIG. 4D, and an opposite side view of the tensioner housing 26 is shown in FIG. 4E. The housing 26 includes the screw window 38 allowing adjustment of the screw 32. The housing 26 includes a flat inner surface portion 26a, a longitudinal centerline CL, the channel 27 and crew head cavity 35. The screw head 33 bears against opposing cavity walls 36a and 36b prevent lateral motion of the screw 32 in the channel 27.

A top view of the slide 30 is shown in FIG. 5A, a front view of the slide 30 is shown in FIG. 5B, a rear view of the slide 30 is shown in FIG. 5C, a side view of the slide 30 is shown in FIG. 5D, and is an opposite slide 30 is shown in FIG. 5E. The slide 30 includes an inner portion 44 which resides behind the housing 26 and bears against the rear surface 24 of the axle flange 20 to position the bicycle chain tensioner 16 and the axle 18 (see FIG. 2). The screw 32 threadedly engages a threaded passable 40 through the slide 30. A head 42 reaches the housing 26 for attachment of the hat 46. A waist portion 41 of the slide 30 resides between the hat 46 and the inner portion 44.

A side view of the slide hat 46 is shown in FIG. 6A, a front view of the slide hat 46 is shown in FIG. 6B, a rear view of the slide hat 46 is shown in FIG. 6C, a top view of the slide hat 46 is shown in FIG. 6D, a bottom view of the slide hat 46 is shown in FIG. 6E, and an opposite side view of the slide hat 46 is shown in FIG. 6F. The hat 46 resides over the protruding head 42 of the slide 30 and extends past the channel 27 to retain the slide 30. At least one set screw 48 in set screw threads 50 retains the hat 46 on the head 42, and preferably, two opposing set screws 48 retain the hat 46 on the head 42. The indicator 28 is fixedly attached to the hat 46 and includes a point 29 alignable with the scale 37 (see FIG. 3D).

The bicycle chain tensioner 16 may be made from a variety of materials but is preferably made from metal, more preferably from aluminum, and most preferably from 6061 T6 aluminum. The screw 32 and other hardware is preferably made from steel and more preferably from stainless steel.

While the invention herein disclosed has been described by means of specific embodiments and applications thereof, numerous modifications and variations could be made thereto by those skilled in the art without departing from the scope of the invention set forth in the claims.

I claim:

1. A bicycle chain tensioner, comprising:
   a housing including:
     a forward end of the housing;
     a rearward end of the housing opposite to the forward end;
     a longitudinal centerline from the forward end to the rearward end of the housing;
     a flat inner surface of the housing extending from the forward end towards the rearward end and parallel to the longitudinal centerline;
     an outer surface of the housing opposite to the inner surface;
     a fixed, round cross section axle hole proximal to the forward end of the housing and perpendicular to the flat inner surface of the housing and having a diameter of a bicycle axle; and
     a longitudinal channel parallel to the centerline and reaching through the housing from the inner surface to the outer surface and spaced apart from the axle hole towards the rearward end;
   a screw residing longitudinally in the channel and parallel to the centerline and the channel, the screw free to rotate but not translate in the housing;
   a slide threadedly engaging threads of the screw to couple rotating the screw with translating the slide forward and rearward in the channel;
   an inner portion the slide extending inwardly out of the housing from the flat inner surface of the housing;
   a head of the slide reaches past the outer surface of the housing; and
   a hat is attachable to the head to retain the slide on the housing.

2. The tensioner of claim 1, wherein:
   a screw head cavity resides in the housing between the channel and the rearward end of the housing; and
   the screw includes a screw head residing in the screw head cavity to limit translation of the screw.

3. The tensioner of claim 2, wherein the screw and screw head reside entirely within the channel and the screw head cavity.

4. The tensioner of claim 2, wherein the housing further includes a screw window through the rearward end of the housing and aligned with the head of the screw, the screw window configured to allow insertion of a tool to turn the screw.

5. The tensioner of claim 4, wherein a screw head cavity resides at an end of the channel opposite to the axle hole.

6. The tensioner of claim 1, wherein:
   a scale is visible on the outer surface of the housing; and
   the hat includes an indicator alignable with the scale.

7. A bicycle chain tensioner, comprising:
   a housing including:
     a forward end of the housing;
     a rearward end of the housing opposite to the forward end;

a longitudinal centerline of the housing from the forward end of the housing to the rearward end of the housing;
an outer surface of the housing;
a flat inner surface of the housing opposite to the outer surface and extending from the forward end towards the rearward end and parallel to the longitudinal centerline;
a fixed axle hole through the housing proximal to the forward end of the housing and perpendicular to the flat inner surface of the housing and having a diameter of a bicycle axle; and
a channel parallel to the centerline and reaching through the housing from the inner surface to the outer surface and spaced apart from the axle hole towards the rearward end;
a screw residing longitudinally in the channel and parallel to the channel, the screw free to rotate but not translate in the housing;
a slide threadedly engaging threads of the screw to couple rotating the screw with moving the slide forward and rearward in the channel;
an inner portion the slide extending out of the housing from the flat inner surface of the housing;
a head of the slide reaches past the outer surface of the housing; and
a hat is attachable to the head to retain the slide in the housing.

8. The tensioner of claim 7, wherein:
a screw head cavity resides in the housing between the channel and the rearward end of the housing; and
the screw includes a screw head captured in the screw head cavity to limit translation of the screw.

9. The tensioner of claim 8, wherein the housing further includes a screw window between the screw head cavity and the rearward end of the housing and aligned with the head of the screw, the screw window configured to allow insertion of a tool to turn the screw.

10. The tensioner of claim 7, wherein:
a scale is visible on the outer surface of the housing; and
the hat includes an indicator alignable with the scale.

11. The tensioner of claim 7, wherein:
the inner portion of the slide bears against the flat inner surface of the housing;
a hat attaches to the slide opposite to the inner portion and bears against the outer surface of the housing; and
the inner portion and hat retain a waist portion of the slide and the screw in the housing.

12. A bicycle chain tensioner, comprising:
a housing including:
a forward end of the housing;
a rearward end of the housing opposite to the forward end;
an outer surface of the housing;
a flat inner surface of the housing opposite to the outer surface and extending from the forward end towards the rearward end and parallel to the longitudinal centerline;
a fixed axle hole through the housing proximal to the forward end of the housing and perpendicular to the flat inner surface of the housing and having a diameter of a bicycle axle; and
a channel reaching through the housing from the inner surface to the outer surface and spaced apart from the axle hole towards the rearward end;
a screw residing in the channel, the screw free to rotate but not translate in the housing;
a slide threadedly engaging threads of the screw to couple rotating the screw with moving the slide forward and rearward in the channel;
an inner portion the slide extending out of the housing through the flat inner surface of the housing and bears against the flat inner surface of the housing;
a hat attaches to the slide opposite to the inner portion and bears against the outer surface of the housing;
the inner portion of the slide and the hat retain a waist portion of the slide and the screw in the housing;
a head of the slide reaches past the outer surface of the housing; and
a hat is attachable to the head to retain the slide in the housing.

13. The tensioner of claim 12, wherein:
a screw head cavity resides in the housing between the channel and the rearward end of the housing; and
the screw includes a screw head captured in the screw head cavity to limit translation of the screw.

14. The tensioner of claim 13, wherein the housing further includes a screw window between the screw head cavity and the rearward end of the housing and aligned with the head of the screw, the screw window configured to allow insertion of a tool to turn the screw.

15. The tensioner of claim 12, wherein:
a scale is visible on the outer surface of the housing; and
the hat includes an indicator alignable with the scale.

* * * * *